US012195010B2

(12) United States Patent
Galdi et al.

(10) Patent No.: US 12,195,010 B2
(45) Date of Patent: Jan. 14, 2025

(54) METHOD AND CONTROL SYSTEM FOR GENERATING AN OPTIMAL DRIVING PROFILE FOR VEHICLES PROVIDED WITH ELECTRIC PROPULSION

(71) Applicants: HITACHI RAIL STS S.P.A., Naples (IT); Vincenzo Galdi, Salerno (IT); Piera Stella, Roccapiemonte (IT); Antonio Piccolo, Naples (IT); Vito Calderaro, Salerno (IT)

(72) Inventors: Vincenzo Galdi, Salerno (IT); Piera Stella, Roccapiemonte (IT); Antonio Piccolo, Naples (IT); Vito Calderaro, Salerno (IT); Luigi Fratelli, Naples (IT); Giuseppe Graber, Naples (IT)

(73) Assignee: HITACHI RAIL STS S.P.A., Naples (IT)

( * ) Notice: Subject to any disclaimer, the term of this patent is extended or adjusted under 35 U.S.C. 154(b) by 182 days.

(21) Appl. No.: 17/709,687

(22) Filed: Mar. 31, 2022

(65) Prior Publication Data

US 2022/0315012 A1    Oct. 6, 2022

(30) Foreign Application Priority Data

Mar. 31, 2021    (IT) .................. 102021000007961

(51) Int. Cl.
*B60W 40/09* (2012.01)
*B60W 30/14* (2006.01)
(Continued)

(52) U.S. Cl.
CPC .......... *B60W 40/09* (2013.01); *B60W 30/143* (2013.01); *B60W 30/18072* (2013.01);
(Continued)

(58) Field of Classification Search
CPC ............... B60W 40/09; B60W 30/143; B60W 30/18072; B60W 40/04; B60W 40/105;
(Continued)

(56) References Cited

U.S. PATENT DOCUMENTS 6,980,894 B1    12/2005  Gordon et al.
2009/0187291 A1*   7/2009  Daum ................. B61L 15/0058
                                               701/19

(Continued)

*Primary Examiner* — Khoi H Tran
*Assistant Examiner* — Christopher Scott
(74) *Attorney, Agent, or Firm* — Leason Ellis LLP

(57) ABSTRACT

An optimal driving profile is generated for vehicles provided with electric propulsion, by providing a sequence of consecutive time intervals until an arrival time and providing a plurality of accelerations that the vehicle can hypothetically take in each of the time intervals; by applying laws of uniformly accelerated motion for each of the accelerations and for each of the time intervals, hypothetical future points along the route are generated, starting from the current position and speed of the vehicle; for each of the time intervals, before analysing the subsequent time interval, it is checked whether the generated points meet all the predefined constraints; if the check has a negative outcome, the point being checked is eliminated from the plausible hypotheses; driving profiles are obtained, each defined by a respective sequence of remaining points; from among said driving profiles, the one requiring a lowest overall energy to be executed is selected.

13 Claims, 5 Drawing Sheets

(51) Int. Cl.
*B60W 30/18* (2012.01)
*B60W 40/04* (2006.01)
*B60W 40/105* (2012.01)
*B60W 50/00* (2006.01)

(52) U.S. Cl.
CPC .......... *B60W 40/04* (2013.01); *B60W 40/105* (2013.01); *B60W 50/0097* (2013.01); *B60W 2510/244* (2013.01); *B60W 2540/30* (2013.01); *B60W 2555/60* (2020.02)

(58) Field of Classification Search
CPC ....... B60W 50/0097; B60W 2510/244; B60W 2540/30; B60W 2555/60; B61L 15/0058; B61L 15/0062; B61L 27/16; B61L 27/20; B61L 25/025; B61L 25/026; G05D 1/0005
See application file for complete search history.

(56) References Cited

U.S. PATENT DOCUMENTS

| | | | |
|---|---|---|---|
| 2014/0180510 A1* | 6/2014 | Fournier | B61L 27/16 701/20 |
| 2014/0222259 A1* | 8/2014 | Yoshimoto | B61L 27/16 701/20 |
| 2015/0120101 A1* | 4/2015 | Kimura | B61L 27/16 701/20 |
| 2016/0129926 A1* | 5/2016 | Tonosaki | B61L 15/0058 701/20 |
| 2021/0129670 A1* | 5/2021 | Vande Haar | B62D 59/04 |
| 2022/0171398 A1* | 6/2022 | Grossman | B60W 60/0021 |
| 2022/0185345 A1* | 6/2022 | Cole | B61L 15/0058 |

* cited by examiner

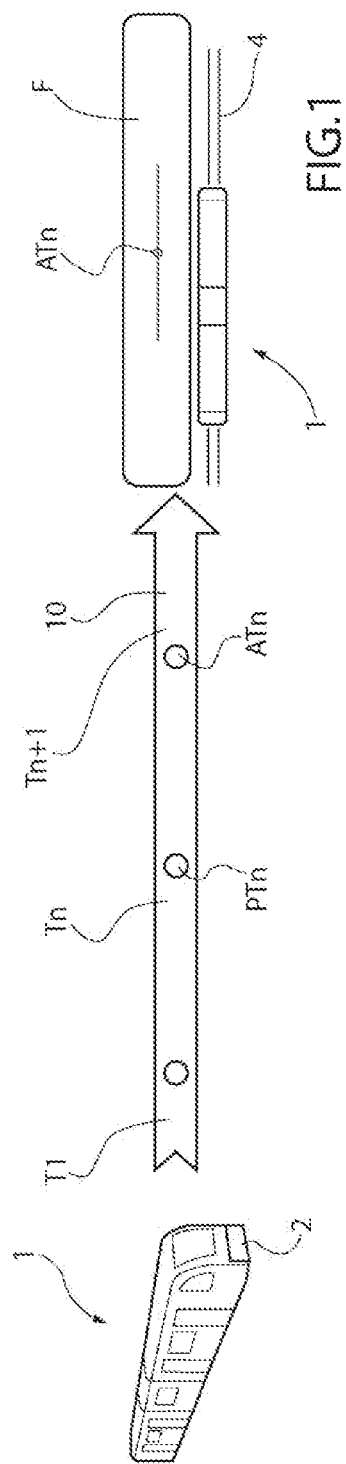
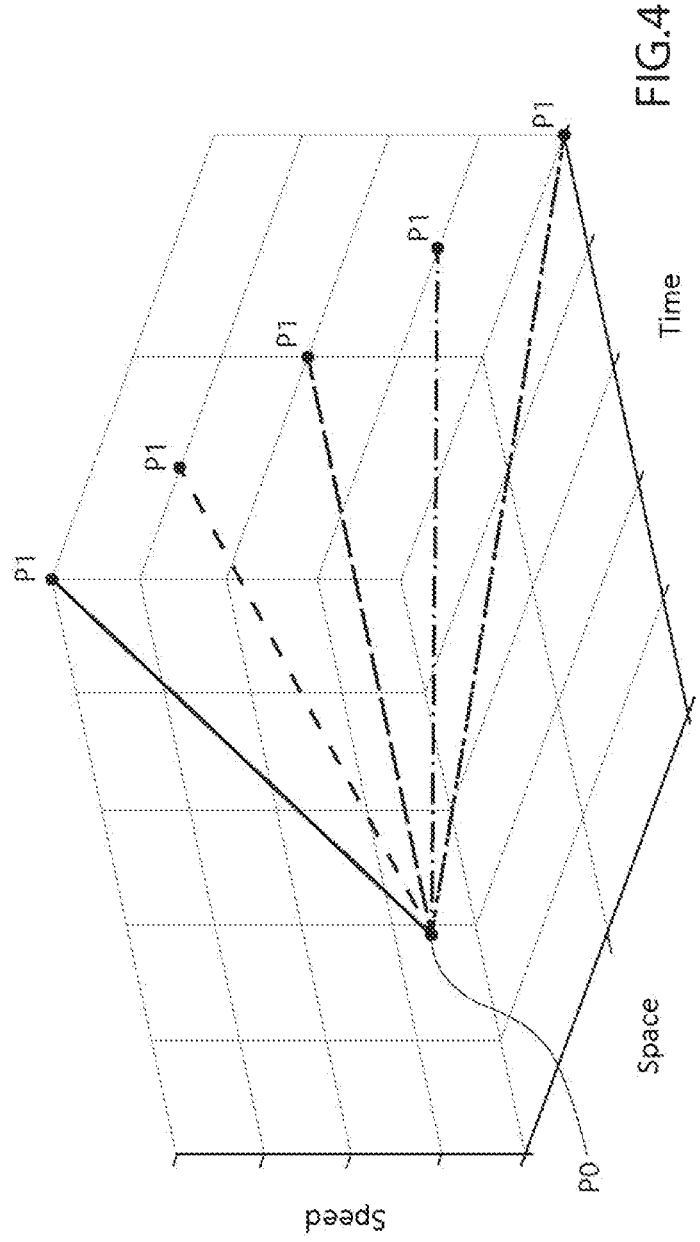

METHOD AND CONTROL SYSTEM FOR GENERATING AN OPTIMAL DRIVING PROFILE FOR VEHICLES PROVIDED WITH ELECTRIC PROPULSION

CROSS-REFERENCE TO RELATED APPLICATIONS

This patent application claims priority from Italian patent application no. 102021000007961 filed on Mar. 31, 2021, the entire disclosure of which is incorporated herein by reference.

TECHNICAL FIELD

The present invention relates to a method for generating an optimal driving profile for vehicles provided with electric propulsion.

In particular, the method of the present invention falls within the scope of those driving support functions that are aimed at saving energy. More specifically, the intervention on the driving style is among the immediately applicable solutions for energy saving, without requiring intervention either on the ground infrastructure or on the structures and traction systems already provided on vehicles.

STATE OF THE PRIOR ART

The method of the present invention can be applied to the railway and tramway field, as well as to other types of vehicles with electric propulsion (powered by batteries or other systems, e.g. fuel cells, that are capable of providing electrical energy for traction). In more detail, the present method can be applied to those vehicles which, in use, operate a public or private transport service by travelling along a predefined route, generally called a "line", divided into a sequence of consecutive stages, each of which ends at a stop, a station or even simply an intermediate point at which the journey time is verified.

In such services, the arrival points of each stage are to be reached within a pre-established time interval, corresponding for example to a pre-established arrival time during the day, known to the users. In other words, the travel times for the various stages of a line are pre-established, and are indicated in a corresponding timetable, which the vehicle driver must try to meet.

In this context, there is a need to process information relating to the operating conditions of the line (e.g. the constraints imposed along the line, such as speed limits or altitude variations, the technical characteristics of the vehicle, the arrival times required by the timetable, etc.) so as to define an optimal driving profile that minimises energy consumption and, at the same time, allows the arrival point of each stage to be reached in the time allocated.

The known state-of-the-art methodologies for optimising driving profiles are of two different types: one commonly referred to as "off-line", in which the optimal driving profile is identified before the vehicle starts its mission, and the other commonly referred to as "on-line", in which the optimal driving profile is identified during the mission itself and can be updated in real time. Vehicles in service (whether motor cars, buses, trolleybuses, trams or surface metros) generally operate in an urban context, which is shared with ordinary traffic roads and includes junctions with possible traffic lights, so operating conditions tend to vary instant by instant. In these cases, therefore, an on-line methodology, with real-time analysis of the operating conditions, is required to achieve an effective result.

Once an optimal driving profile has been generated, the control system may provide the driver (in a timely manner, in relation to the actual response times of the driver and the vehicle) with information suggesting the extent of an acceleration command to be set while driving the vehicle, or suggesting the speed to be reached, in order to achieve the optimal driving profile; or, on vehicles provided with a self-driving system, the command system may send an appropriate command signal directly to that self-driving system.

The speed of calculation and the simplicity of the algorithm are therefore particularly important in order to obtain the optimal driving profile promptly, so that the information can be re-processed and the result corrected if necessary (e.g. if the operating conditions change, and/or if the driver is unable to follow the driving suggestions provided by the control system due to unexpected events).

OBJECT OF THE INVENTION

Aim of the present invention is therefore to provide a method for generating an optimal driving profile for vehicles provided with electric propulsion, which enables the above requirements to be met simply and economically and which is suitable for on-line implementation.

According to the present invention, there is provided a method as defined in the appended claims.

The present invention also relates to a control system as defined in the appended claims.

BRIEF DESCRIPTION OF THE DRAWINGS

The invention will be now described with reference to the enclosed drawings, which show an exemplary non-limiting embodiment thereof, wherein:

FIG. 1 shows, schematically, a vehicle that is provided with electric propulsion and travels along a line consisting of a sequence of stages;

FIGS. 4 and 5 are charts showing different steps of the method according to the present invention;

PREFERRED EMBODIMENT OF THE INVENTION

In FIG. 1, reference number 1 denotes a vehicle provided with electric propulsion, i.e. a traction system 2 (schematically shown) comprising electric motors which drive the wheels (not shown) and are powered by electrical energy, through appropriate electronic equipment of a known type (traction inverters, filters, etc.), not shown and not described in detail. The vehicle 1 may be a railway or tramway vehicle or an underground metro, i.e. a vehicle travelling on rails 4, as shown by way of example, but it could also be a wheeled vehicle travelling on the road, such as a bus, trolley bus, a vehicle for goods transportation or motor vehicle, albeit still with electric traction.

In the example that will be described below, the vehicle 1 is driven by a driver or controlled by a remote station. Alternatively or in combination with this solution, the vehicle 1 may be provided with a self-driving system to be driven automatically without a driver.

In use, the vehicle 1 performs a transport service, for example for the transport of passengers, along a line 10 of a pre-established type. Line 10 consists of a series of stages T1, . . . , Tn, Tn+1 . . . arranged according to a spatial sequence one after the other. Each stage Tn starts at a corresponding departure point PTn and ends at a corresponding arrival point ATn (where: AT(n−1)=PTn and ATn=PT(n+1)). For example, the departure and arrival points are defined by respective stops or stations F, which are provided with platforms where the vehicle stops for passengers to board and/or alight. However, the stages Tn may be defined by intermediate points along a section of line that does not foresee stops, i.e. without foreseeing a stoppage and a possible parking of the vehicle, for example in order to check intermediate travel times along the line 10 at pre-established points.

Line 10 is associated with a timetable, i.e. a table containing, for each stage Tn, a respective time or instant of time On required by the service to complete that stage Tn, i.e. to meet a pre-established service time (which is usually also known by the service user).

The vehicle 1 comprises an architecture or control system, described in more detail below, and comprising at least one block or an electronic control unit configured to process an algorithm, encoded in a suitable computer program (software), and carry out a method shown schematically in a simplified manner in FIG. 2. This method generates an optimal driving profile Gott for each stage Tn, in response to a plurality of input data.

The input data can be divided into two categories: the first category is defined by configuration data which are set before travelling along line 10, and which are of a stationary character, i.e. they do not change over time during the execution of each stage Tn; and the second category is defined by data relating to operating conditions which may change over time during the mission, i.e. while the vehicle 1 is travelling along each stage Tn.

Figure 2:
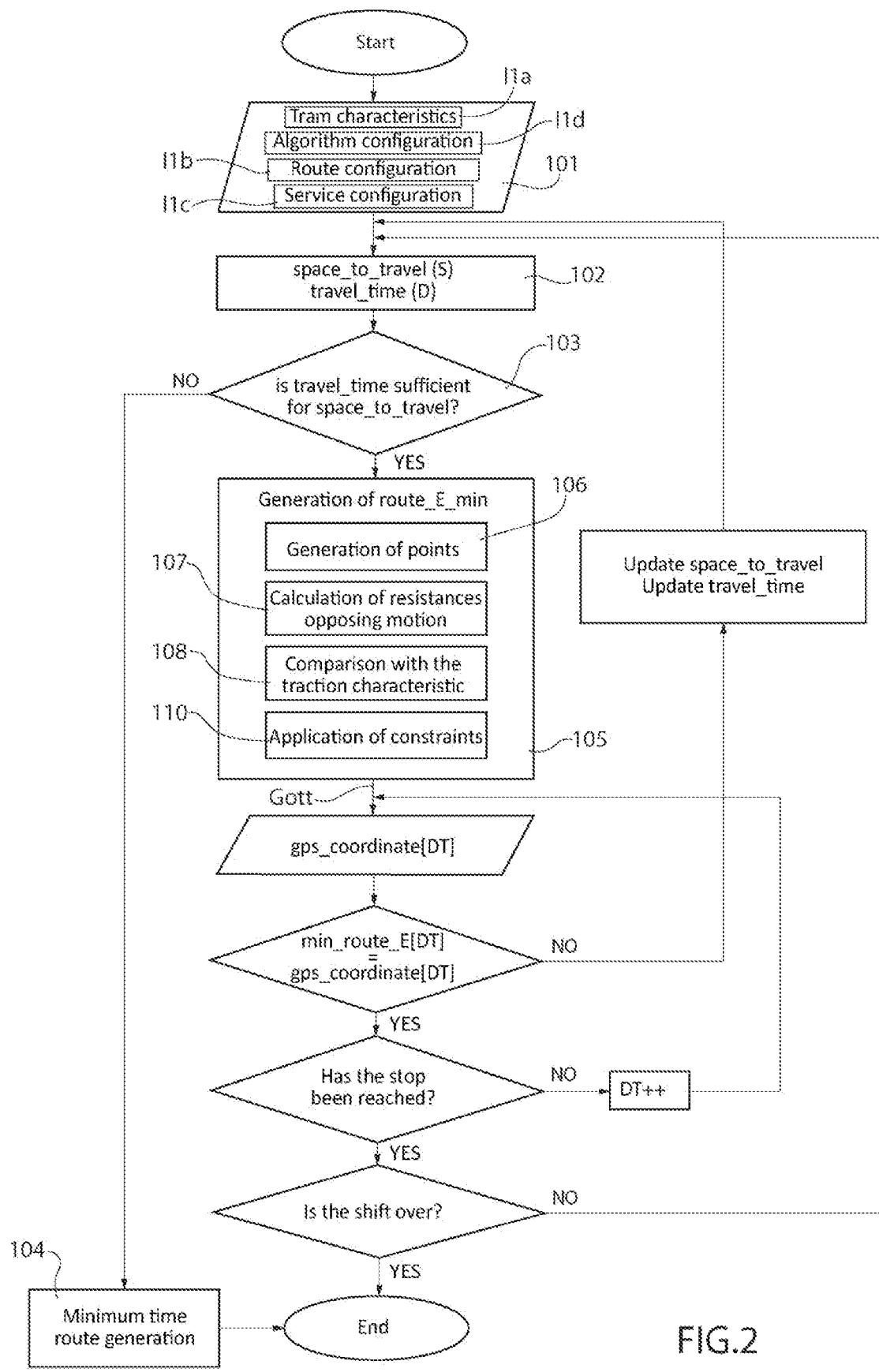
FIG. 2 is a flow chart, or block diagram, showing, in a schematic and simplified manner, a preferred embodiment of the method for generating an optimal driving profile for vehicles provided with electric propulsion according to the present invention.

The input data of the first category are considered to be known per se, and foreseen in a preliminary step (step 101) of the method in FIG. 2. This input data may, in principle, be provided to the algorithm via different modes: e.g., they may already be available in the control system on the vehicle 1, as stored in a memory (not shown), and/or they may be manually set by an operator or by the driver, and/or they may be transmitted to the control system from the outside, e.g., from a remotely located control station or via available web-based applications. Preferably, the input data in the first category comprise four types of data, namely:

data or values I1a, relating to the characteristics of the vehicle;

data or values I1b relating to characteristics of the route along each stage Tn;

data or values I1c, relating to the public service to be satisfied;

data or values I1d relating to settings to adjust the processing performed by the algorithm.

In particular, the data I1b comprise at least some of the following information: position, i.e. spatial coordinates, of the departure, arrival and intermediate points of each stage Tn; location and curvature of curves that may be present along the route; location of possible junctions; location of possible interchanges along the tracks 4 in the case of constrained-driving transport systems; altitude data along the route, defined for example by positive or negative slopes at each point of the route; speed limits known, for example from the road code, for the various points of the route; any other elements of the route of a stationary character (for example level of friction between wheels and tracks or the road) that can result in a slowdown or ease of motion of the vehicle and therefore a variation in the power required for the traction of the vehicle.

These data are bi-univocally associated with the position of each point of the route. In other words, each point of the route is identified by its own position (i.e. by one or more coordinates representing it in a spatial reference system) and is associated with a series of data corresponding to the aforesaid data I1b.

Preferably, the data I1b is contained in a stored configuration file, which can be replaced or modified according to need. In fact, if the vehicle 1 has to change the mission, i.e. it has to change the line and/or the timings of the service, it will be sufficient to upload a new configuration file with updated data into the memory of the control system. The new data can also be sent to the vehicle 1 remotely.

Instead of being stored, the data I1b could be obtained in other ways, for example by retrieving information from a service or web application that interfaces with a GPS positioning application provided on the vehicle.

The data I1c comprise the times On of the various stages Tn and are bi-univocally associated with the positions of the arrival points ATn; however, the data I1c may also comprise other information of the service to be supplied (e.g. any stopping times planned at the stops for passengers to board and alight). Preferably, the data I1c are also contained in a configuration file, which is stored in the control system and can be updated. In fact, if the vehicle 1 has to change its mission, it is sufficient to upload a new configuration file (which can possibly be transmitted to the vehicle 1 remotely).

Figure 7:
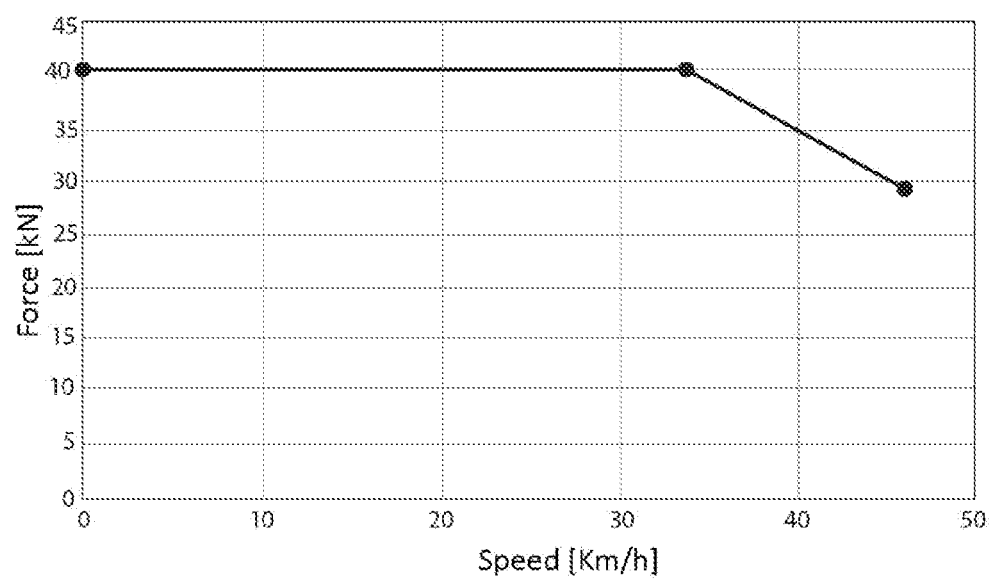
FIG. 7 is an exemplary chart showing a traction characteristic (force/speed) of a vehicle with electric propulsion.

As regards the data I1a relating to the technical characteristics of the vehicle, they comprise at least some of the following information: vehicle mass; maximum speed allowed by the traction system; maximum accelerations allowed by the traction system and/or the braking system; maximum jerk (acceleration variation) normally accepted by passengers; information indicative of the torque and/or the suppliable maximum power of the traction system 2 (this information is, for example, represented by a force/speed traction characteristic as shown in the chart in FIG. 7); expected yields between the energy source and the wheels, preferably comprising a yield associated with the traction steps and a yield associated with the braking steps (with energy recovery and/or with dissipative braking, of rheostatic, mechanical, pneumatic, hydraulic type, etc.). The data I1a relating to the vehicle are also preferably contained in a configuration file (which generally does not need to be updated).

With regard to the data I1d, they preferably comprise a spatial tolerance value, which is used by the algorithm to approximate the position of the arrival point ATn of each stage Tn, and thus to accept all the solutions which manage to cover the length of the stage Tn with an error not exceeding this spatial tolerance value.

Preferably, the data I1d also comprise a time tolerance value, which is used by the method to approximate the time On required by the service to end each stage Tn and thus to accept all the solutions covering the stage Tn with an error not exceeding this time tolerance value.

The algorithm is configured to determine an optimal driving profile for each stage Tn, while the vehicle 1 is starting or travelling along that stage Tn.

Figure 3:
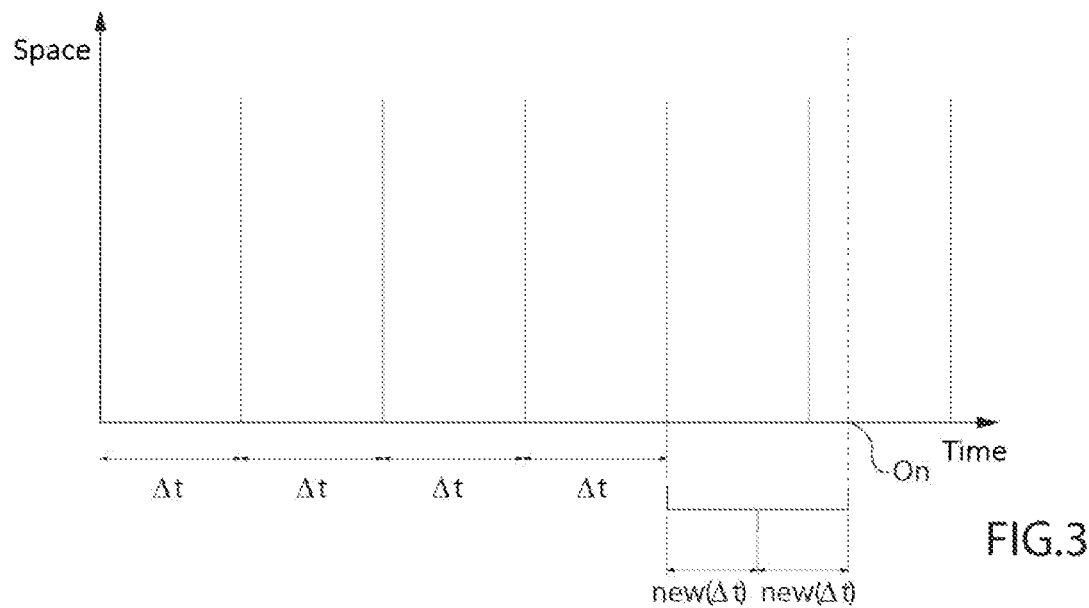
FIG. 3 is a diagram showing a division of the time set to complete a stage into a series of subsequent time intervals.

First of all, when searching for the optimal driving profile of the stage Tn, the algorithm (step 102 in FIG. 2) calculates the space S yet to be travelled, based on the position of the arrival point ATn and the current position of the vehicle 1, and calculates the time interval D still available to arrive on time, based on the time On required at the arrival and based on the current time instant. The time interval D is divided into a series of elementary time intervals or steps, that is, it is "discretized". Preferably, in order to optimise the calculation resources without compromising the accuracy of the result, the method uses a time discretization step that is fixed for most of the stage Tn, and has a different value only for the final part, i.e. in proximity of the arrival point ATn, as shown in FIG. 3. In other words, the discretization of the time interval D includes a constant time step $\Delta t$, by default, and a new time step ($\Delta t$), which is calculated by the algorithm. The time step new($\Delta t$) is such that the sum of all elementary time intervals ($\Delta t$ and new($\Delta t$)) is equal to the time value D (to arrive at the time On, in particular taking into account the time tolerance value mentioned above). Preferably, the discretization and calculations are carried out so that the number of elementary time intervals equal to new($\Delta t$) is exactly equal to two.

The temporal extent of the intervals $\Delta t$ is part of the data I1d (algorithm settings). In particular, it is set to be compatible with the driver's reaction times if the algorithm is used as a support tool to suggest a driving style to the driver himself.

In addition to the interval $\Delta t$, the data I1d relating to the settings of the algorithm comprise a plurality of pre-established acceleration values aj (both positive and negative) assumed during the journey in each of the future time intervals of the stage Tn. These pre-established acceleration values aj are defined by initial (configurable) settings, represent the accelerations that can be set while driving the vehicle, and are finite in number, preferably at least three.

By analysing each future time interval with the equations of motion, the algorithm will calculate accelerations ajk, at the wheels, where each acceleration ajk is defined by the sum of a corresponding pre-established acceleration value aj and a component due to the resistances of the motion, such as, for example, the slopes along the route, the radii of curvature in the curves of the route (if foreseen and known in the data I1b) and possibly the aerodynamic resistances.

In addition, the method considers two other possible values of accelerations ajk, in particular:
- a zero value, corresponding to a "cruising" condition (i.e. with the vehicle travelling at a constant speed, thanks to a traction force that consumes energy only to compensate for the resistance to motion), and
- a value corresponding to a "coasting" condition (i.e. a condition of travel by inertia, without traction or braking); this acceleration value is calculated by the algorithm for each time interval ($\Delta t$ or new($\Delta t$)) determining the resistances to motion foreseen in that interval, and dividing the value of these resistances by the equivalent travelling mass (equal to the sum of the vehicle mass, and the load mass, which may be detected or estimated by known methodologies, for example by counting the number of passengers getting on and off).

Therefore, the algorithm takes into account at least five possible acceleration values ajk, to estimate or assume the operation of the vehicle in each future time interval of the stage Tn. In particular, the number of accelerations ajk used is ranging between 6 and 10, in order to have a good compromise between low calculation times and result optimisation.

Preferably, the data I1d (the spatial tolerance and time tolerance values, the default value of the time step $\Delta t$, the number and the pre-established acceleration values aj) are provided to the algorithm through another configuration file, which can be updated.

In particular, the algorithm receives and reads the data I1a and I1d during the ignition step, and the data I1b and I1c in the presence of a signal indicating the start of a mission (provided, for example, by the driver).

As a preliminary step, the algorithm checks whether the time D is sufficient to cover the space S, i.e. it is sufficient to arrive at the arrival point ATn (step 103 in FIG. 2). In particular, this check is carried out in a simplified way, without taking into account route information (data I1b) and non-stationary information detected during the mission. For example, the algorithm calculates whether the time D is sufficient assuming that the space S is travelled with a standard type motion profile, e.g. a constant maximum speed motion profile, or a "triangular" or "trapezoidal" type motion profile, i.e. a journey that begins with a maximum acceleration, until reaching a maximum allowed speed, which is possibly maintained until proximity of the arrival, to finally set a maximum allowed deceleration up to this arrival point.

If this preliminary check has a negative outcome, the algorithm generates a driving profile that minimises the travel time and thus limits the delay (step 104). If the check in step 103 has a positive outcome, the input data are processed to generate the optimal driving profile (step 105).

This processing involves, as explained above, the step of dividing time D into a series of future intervals or steps, $\Delta t1$, $\Delta t2$ ... $\Delta t(k)$, $\Delta t(k+1)$, defined by the intervals $\Delta t$ and new($\Delta t$) described above. The intervals $\Delta t(k)$ correspond to distinct and subsequent analysis intervals; in other words, the algorithm analyses the intervals $\Delta t(k)$ one after the other.

For each interval $\Delta t(k)$, as mentioned above, the algorithm uses the equations of motion: starting from the values of position $x(k-1)$ and speed $v(k-1)$ of the vehicle, at the beginning of the interval $\Delta t(k)$, the algorithm determines the hypothetical position $x(k)$ and the hypothetical speed $v(k)$ that the vehicle will reach at the end of this interval $\Delta t(k)$, for each of the aforesaid accelerations ajk.

$$v(k)=v(k-1)+ajk\cdot\Delta t(k)$$

$$x(k)=x(k-1)+v(k-1)\cdot\Delta t(k)+\tfrac{1}{2}\cdot ajk\cdot\Delta t(k)^2$$

Figure 5:
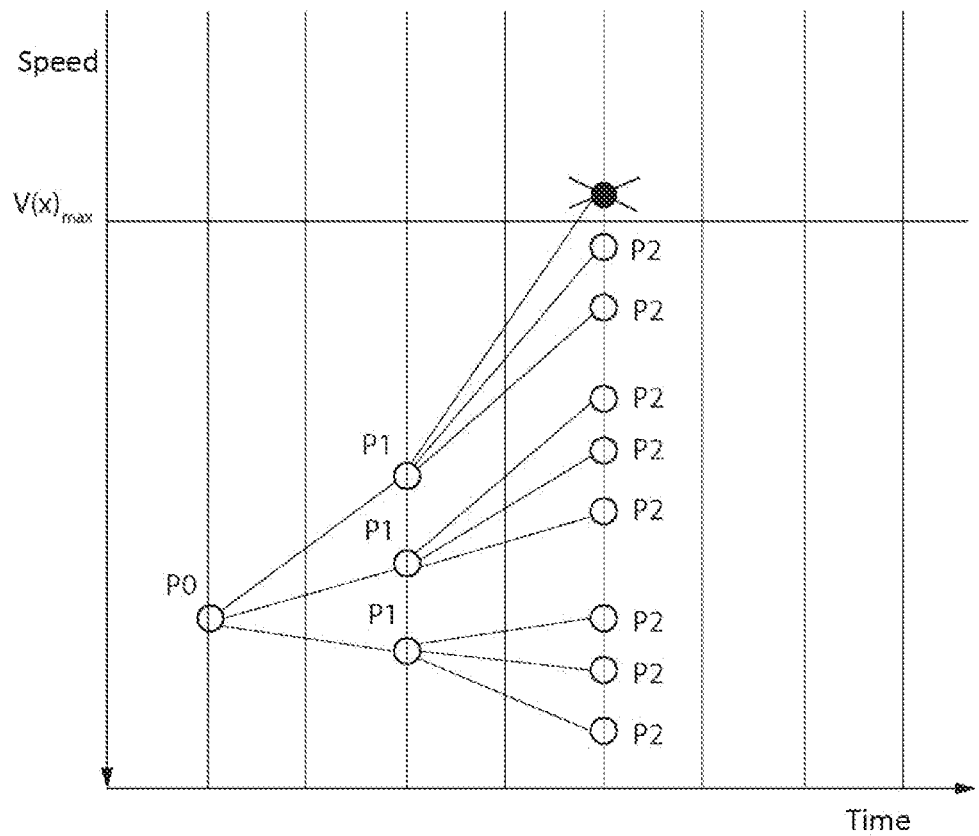
Figure 6:
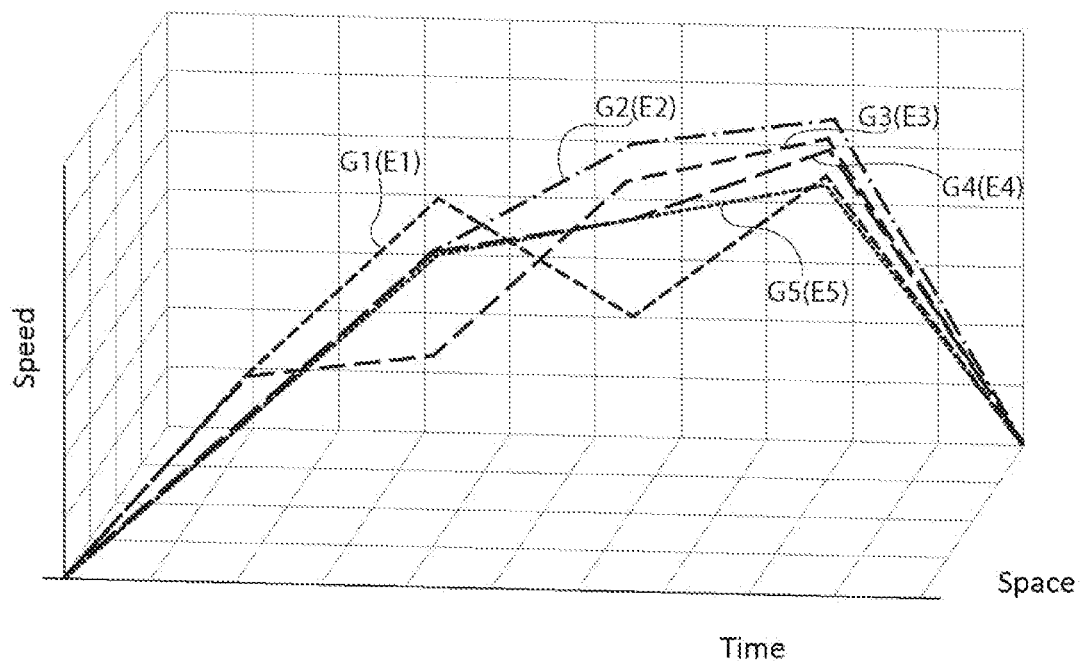
FIG. 6 is analogous to FIG. 4 and shows, in a simplified manner, various possible driving profiles which are generated according to the method of the present invention, and from which the one with the lowest energy consumption is selected.

The position x0 and the speed v0 at the beginning of the first interval $\Delta t1$ correspond to the current position and speed (detected by devices of known type, provided on board of vehicle 1); starting from these values, as shown schematically in FIG. 4, with the aforesaid equations the algorithm determines a plurality of hypothetical end points P1 (one for each of the accelerations aj1 assumed) at the end of the first interval $\Delta t1$. It is evident that each point P1 is associated with respective values of position x1 and of speed v1, as well as a time value. The processing proceeds in the same way for each of the intervals Δt(k): as shown schematically in FIG. 5, the algorithm takes into account the interval Δt2 and reiterates the calculation with the equations of motion, starting from each of the points P1 and for each of the accelerations aj2, in order to determine which are the hypothetical end points P2, and so on for the subsequent intervals Δt3, Δt4, etc.

In other words, starting from each point that was determined in step k−1, the algorithm generates a number of points Pk equal to the number of accelerations ajk (some indicative of the values pre-established at the initialisation step, and two defined by the accelerations that guarantee "coasting" and "cruising").

This generation of the hypothetical future points Pk for each interval Δt(k) is indicated in FIG. 2, as a whole, by step 106.

Advantageously, for each interval Δt(k) (before analysing the subsequent interval Δt(k+1)), after using the equations of motion to predict the end points Pk, the algorithm checks that each of the accelerations applied in the equations of the motion does not require a traction force greater than the maximum force that can be supplied by the traction system 2. A chart representing the force-speed characteristic of the traction system 2 is preferably used for this purpose. In more detail, the algorithm performs the following operations:

calculates the resistances R that the vehicle encounters in the interval Δt(k), for each of the accelerations ajk (step 107); for this purpose, calculation methods to obtain the resistances R are already known in the literature, such as the aerodynamic resistance based on the Davis formula or the resistance linked to friction based on the Von Röckl's formula; the value of the resistances R also include the effects of the slopes and curves of the route;

calculates the traction force Fteor theoretically necessary to reach the acceleration ajk, and overcome the resistances that have been calculated $$Fteor=(me \cdot ajk)+R$$

where me is the equivalent travelling mass, which is calculated by adding the mass of the vehicle (set during the configuration step) and the mass of the load (determined on the basis of signals emitted by on-board sensors, for example by sensors on seat belts, sensors mounted on suspensions, person counter sensors, etc.);

compares (step 108) the traction force Fteor with the maximum suppliable traction force (Fc) provided by the force-speed characteristic (corresponding, on the x-axis of the chart, to the speed v(k) that has been calculated with the equations of motion): if Fteor>Fc, the values of position x(k) and speed v(k) of the point P(k) obtained with the acceleration ajk being checked are left out; preferably, position and speed of this point are recalculated using, in the equations of motion, a corrected acceleration value, defined by the maximum acceleration that can be implemented by the traction system: ajk'=(Fc−R)/me.

According to one aspect of the present invention, for each interval Δt(k) (before processing the subsequent interval Δt(k+1)), at step 110 of FIG. 2 the algorithm performs at least one checking operation so as to determine whether each of the points P(k) that have been obtained through the equations of motion meet one or more constraints, for example defined by the route (data I1b) and/or by the characteristics of the vehicle (data I1a). If the check has a negative outcome, the point P(k) being checked is eliminated from the plausible hypotheses (i.e., it is not considered when processing the subsequent interval Δt(k+1)), as in the example shown schematically in FIG. 5.

In more detail, step 110 includes one or more of the following checks:

checks whether the speed v(k) at the end of the interval Δt(k) is not greater than a maximum allowed speed vmax (defined, for example, by a road speed limit);

checks whether the acceleration ajk (which includes the component due to possible slopes) is not greater than a maximum allowed acceleration and/or deceleration;

checks whether the jerk (acceleration variation) is not greater than an allowed maximum value;

checks whether the position reached x(k) is greater than the previous position x(k−1) (and/or whether v(k) is greater than zero).

It is sufficient that even one of the constraint conditions is negative for the point P(k) considered for the check to be discarded.

Preferably, for each remaining point that passed the previous checks, the algorithm also checks whether the arrival point ATn can still be reasonably reached in the remaining time. This check is carried out, for example, by setting a standard motion profile, for example of the "triangular" or "trapezoidal" type as described above. If this further check has a negative outcome, the point P(k) is again discarded, i.e. eliminated from the list of plausible points that will then be considered in the processing for the subsequent interval Δt(k+1).

After discarding the points that are not plausible, for each remaining point P(k) the algorithm calculates the energy jump necessary to reach this point P(k) starting from the specific point P(k−1) that originated it.

In particular, in order to obtain the necessary energy jump ΔE from point P(k−1) to point P(k), the traction or braking force necessary for the vehicle to move is taken into account. This force is the minimum value between: the maximum traction force Fc obtained from the chart in FIG. 7, and the force Ftr necessary to reach the considered acceleration ajk and to overcome the resistances R (including the slopes and the curves) for the interval Δt(k), $$Ftr=\text{MIN}[(me \cdot ajk)+R;Fc]$$

For example, in the case of "coasting": Ftr=0; and in the case of "cruising": Ftr=R.

ΔE is then calculated by multiplying the traction force Ftr for the displacement ΔS in the considered interval ΔS= (x(k)−x(k−1)), and for the yield from the energy source to the wheels (included in the data I1a).

Finally, the algorithm finishes the operations for each step k by calculating the overall energy consumption required to reach each remaining point P(k), starting from the current position and instant, i.e. by summing up the various contributions or energy jumps ΔE associated with all the previous intervals Δt. For example, the algorithm concatenates each remaining point, P(k), with the previous point, P(k−1), that originated it, until it reaches the current position of the vehicle, and then calculates the necessary energy consumption associated with each "chain" or sequence of points, adding the various contributions ΔE.

The calculation of each energy jump ΔE, and the resulting overall energy consumption, is performed during the analysis of each interval Δt(k).

The operations of searching for future points P(k) and checking/decimating these points are repeated for each Δt, until the arrival point ATn of the stage Tn considered is reached. In particular, in the processing carried out with the laws of motion for the last time interval, the algorithm applies the aforesaid spatial and/or temporal tolerance values, so as to extend the number of possible solutions from which to find the optimal driving route, without significantly increasing the computational burden.

At this point, the algorithm has several possible sequences of points, in which each point is concatenated with those that originated it: each sequence or "chain" of points that has been obtained defines a possible driving profile G1, G2, etc., which is associated with a respective overall energy consumption E1, E2, etc.

The driving profile associated with the lowest overall energy consumption is selected by the algorithm as the optimal driving profile Gott. In other words, the algorithm provides, at the output, a minimum energy driving profile, among all those connecting, in the available time D, the current position with the arrival point Atn of the considered stage Tn. It is evident that the algorithm selects, among all the possible driving profiles identified (G1, G2, etc.), the one with the lowest energy without resorting to either deterministic or heuristic optimisation algorithms, which require calculation resources and execution time that could be incompatible with real-time execution (i.e. incompatible with "on-line" solutions). For example, according to the present invention, the optimal profile Gott is selected by a search for the minimum value within a vector/matrix (consisting of the values E1, E2, etc.) through algorithms of a known type.

In addition, the checks that lead to a possible rejection of points at each interval Δt(k), are decimation operations that significantly reduce the number of alternative driving profiles (G1, G2, etc. . . . ) that are generated, and that will then be compared with each other to establish which one the optimal driving profile is.

On the other hand, by processing the data in any of the steps k (i.e., for any of the intervals Δt(k)), if no point remains after the decimation checks, mentioned above, the processing in order to find the optimal profile (step 105) stops, and the algorithm goes directly to step 104 (in a manner not shown): the algorithm proposes a minimum time driving profile with a standard motion profile, for example of the "triangular" or "trapezoidal" type as described above, in order to try to limit the delay with respect to the established time.

With regard to the speed limit vmax to be taken into account in the checks, the algorithm can determine a maximum speed value in real time, not only on the basis of the values contained in the configuration files, but also on the basis of input data which vary over time, in particular on the basis of detections and/or signals provided by a traffic light signalling block (when available) and/or by an ADAS (Advanced Driver Assistance System) provided on board (when available). In particular, the algorithm applies a maximum speed value defined by the minimum of the following: the stationary type speed limit relating to the route (included among the data I1a), the speed limit identified by ADAS through systems called "Traffic sign recognition" or "Speed limit signs recognition"; the speed limit identified by ADAS through systems called "Autonomous Emergency Braking Systems" or "Emergency Brake Assist"; and the speed limit established by the traffic light signalling/preference giving system.

Preferably, if the ADAS predicts a future stoppage or slowdown in the presence of an obstacle, or if the traffic-light preference giving system predicts to encounter a red traffic light, the algorithm introduces a new false stop at zero speed or a new speed limit along the path: the algorithm then recalculates the optimal driving profile for the remaining section to be travelled, taking into account the indications provided in real time by the ADAS and/or the traffic-light preference giving system.

The optimal driving profile Gott that was processed and selected in step 105 (or the minimum time driving profile obtained in step 104) defines a result that can be used to determine signals indicative of speed, acceleration, power, etc. to be set and/or reached on the vehicle 1, in order to be able to precisely meet such a driving profile. As mentioned above, the result obtained by the algorithm can be used to provide the driver with information suggesting a driving style that allows energy saving (and to arrive on time at the arrival point ATn of the stage Tn). In other words, the result of the algorithm can be used as a driving support system: driving suggestions are displayed on an interface device, called the Human Interface Machine. For example, such suggestions comprise an acceleration or command level to be set and/or a speed to be reached and maintained in order to obtain the driving profile selected by the algorithm.

Preferably, the algorithm also performs a check (step 112) whether the vehicle is actually following the optimal driving profile Gott, i.e. whether the driver is following the suggestions given to him. In particular, this check is based on a comparison between the actual position of the vehicle, detected for example by a GPS block, an odometer and/or a speedometer placed on board (step 111), and the expected position based on the optimal driving profile Gott that has been used to provide driving suggestions to the driver. If the check has a negative outcome (i.e., if a deviation is recognized, greater than a threshold defined in the configuration files in step 101, between the behaviour of the vehicle with respect to what the algorithm had predicted in the optimal driving profile Gott), the algorithm recalculates the space yet to be travelled S, the remaining travel time D and therefore the new optimal driving profile.

Figure 8:
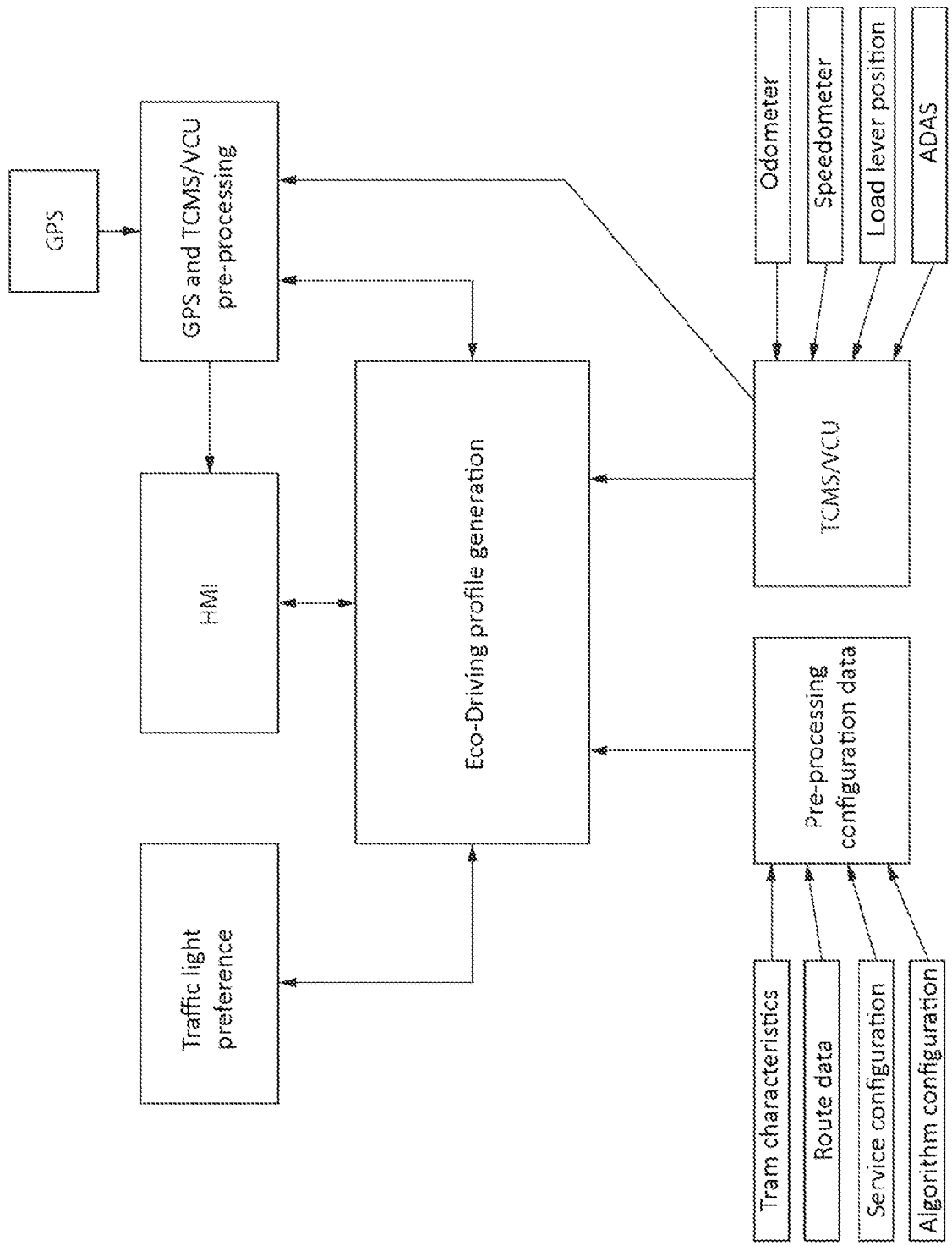
FIG. 8 schematically shows a preferred embodiment of the control system or architecture to carry out the method of the present invention.

As shown schematically in FIG. 8, in order to obtain the optimal driving profile Gott, the algorithm integrates the information coming from a certain number of sensors and/or systems installed on the vehicle 1. The information is usually mediated by a control unit referred to as the "Vehicle Control Unit" (VCU) for road vehicles or as the "Train Control & Management System" (TCMS) for rail vehicles: this unit dialogues with the on-board sensors and manages the vehicle. In case the result of the algorithm is used by a self-driving system, the VCU/TCMS is also the recipient of this result and will be responsible for implementing it after determining the commands for the traction system.

The individual blocks of the control system or architecture shown in FIG. 8 will now be described, partly following the data flow for the algorithm shown above.

A. "Pre-Processing Configuration Data" Block

It takes care of pre-processing the data coming from the configuration files and of providing them to the algorithm for generating the optimal driving profile Gott.

In particular, these files are organised as follows:
data I1c relating to the service
  route
  sequence of stops
  time needed to travel the space between two subsequent stops (section)
data I1b relating to the route:
  altitude profile and radii of curvature
  speed limits
  gauge (if provided and/or known)

data I1a relating to vehicle design characteristics:
mass
mechanical friction coefficients
traction characteristic
braking and traction performance
wheel diameter
pin diameter (if provided and/or known)
pin-bearing friction coefficient
wheel-rail friction coefficient (if provided and/or known)

data I1d relating to the configuration of the algorithm:
maximum acceleration
maximum deceleration
default interval dimension Δt
maximum error threshold between predicted position and GPS position for recalculation of the driving profile
number and values of accelerations (aj)

The function of this "pre-processing" block is to take the data of the configuration files, pre-process them and provide for the initialisation of the block which is then responsible for generating the profile Gott.

As a first operation, the available time D to reach the end of the stage is divided into an integer of intervals Δt, as explained above. The dimension of these intervals is chosen by the user (e.g. to be compatible with the driver's reaction times).

In addition, the coefficients of friction between moving parts and the geometric characteristics of the mechanical parts are used to calculate the internal resistances to motion.

B. "Eco-Driving Profile Generating" Block

This is the processing block dedicated to the calculation of the optimal driving profile Gott, with minimum energy.

This block receives the following input data:
vector of the time intervals
vector of the accelerations (ajk)
equivalent mass (me)
arrival time
resistances to motion
traction characteristic It provides, at the output, the driving profile selected by the algorithm described above. Summing up what has been said above, this block applies the equations of uniformly accelerated motion to calculate all possible plausible future points, each one marked, in particular, by a value of space, speed, mechanical and electrical power and energy, determined in the analysed time interval and for each of the accelerations considered; furthermore, before consolidating the point and making it the root of a possible future route, this block checks that all the constraints are met (as explained above, this decimation operation allows a significant reduction in calculation time, making the algorithm real-time, i.e. executed in a time compatible with the driver's reaction times). Regarding the constraints that can be imposed, please refer to the above: when a point does not comply with even one of the aforesaid constraints, it is eliminated.

As mentioned, this operation is repeated at the analysis of each time interval in order to eliminate as many points as possible.

At the end of the analysis of all the time intervals, each possible driving profile is characterised by an overall energy value (E) obtained as the sum of all the partial energies (ΔE) of the respective intervals; from among all the possible driving profiles, this block selects the driving profile associated with the lowest energy value.

C. "TCMS/VCU" Block

It identifies the vehicle control unit, VCU or TCMS, which manages and monitors the devices and sensors on the vehicle (via a CAN serial bus, for example). In particular, this block receives the following input data:
odometer data
speedometer data
data relating to the position of the command lever operated by the driver
data provided by ADAS.

The speed and space data provided by the odometer allow a double check of the actual position and speed values against those provided by a GPS block and resolve any error conditions. The position of the command lever, on the other hand, allows the driver's actions to be monitored, so as to predict the failure to reach the speed target or setpoint (established based on the driving profile previously obtained) and urge the driver to provide the required command and, therefore, the traction force.

Finally, the data coming from ADAS are used to predict the presence of obstacles and to recognise road signs outside the vehicle during the journey, in ways that are known and not described in detail.

D. "GPS-TCMS/VCU Pre-Processing" Block

It has the task of comparing the theoretical position and speed values, obtained from the optimal driving profile, with the real values provided by the GPS block and the TCMS/VCU block, in order to check that this optimal driving profile is actually respected.

It communicates with the TCMS/VCU block and the GPS block to receive position and speed detected by GPS, and space and speed detected by odometer.

This block compares the optimal driving profile Gott, at each time interval Δt, with the current space and speed values coming from the GPS block and from the TCMS/VCU block. When the current value (e.g. defined by the average between the GPS value and the value provided by the TCMS/VCU block) does not match the theoretical value of the driving profile, preferably the driver is first warned that the suggested speed target has not been respected. If the deviation persists, the optimal speed profile is recalculated from the actually remaining time and space values.

E. "HMI" Block (Human Machine Interface)

It has the task of communicating to the driver useful suggestions to support the driving style that follows the optimal driving profile, in case it is not a self-driving vehicle in driverless mode. It receives, as input, this driving profile together with the current position and speed data (combination filtered between the data of the GPS block and the data provided by the TCMS/VCU block). The information is reported, as output on a graphic interface and is defined, in particular, by a setpoint or speed target to be reached, and/or by an acceleration to be set, by operating a command lever or accelerator pedal of the vehicle. On the HMI, the target is continuously updated to constantly provide information on whether the suggested driving profile is being followed correctly.

The graphical interface, in particular, also shows the following information:
space that has yet to be travelled before reaching the subsequent stop (ΔTn);
speedometer
graphical tracking of the current position with respect to the entire line.

Preferably, the HMI block allows the driver to select the mission, i.e. the service and the line to be travelled. After manual selection, the HMI block re-initialises the algorithm according to the data I1b and I1c in the configuration files.

F. "Traffic-Light Preference Giving" Block

Thanks to this block, it is possible to synchronise the passage of the vehicle with the state of the traffic lights. Information relating to this state is transmitted to the vehicle by an external traffic light management service or system; in particular, this block receives information relating to:

current state (green, red, etc.) of the traffic light signal remaining time before the current state is changed;

dwell times of the subsequent states of the traffic light signal (covering a time at least equal to the duration of the stage).

The traffic-light preference giving block sends this information to the eco-drive profile generating block, which recalculates the optimal driving profile to be followed.

In other words, this information is used by the algorithm, in real time, to predict the speed to be set in order to stop in time in case of a red signal, or to continue driving at the appropriate speed to reach the traffic light signal in time to still find the green state.

In detail, the eco-drive profile generating block interacts with the traffic-light preference giving block and checks whether, with the driving profile identified at that instant, the next traffic light is reached while the latter is in the go-ahead (green) state. If the check has a negative outcome (the traffic light will be reached when the latter is in denied way state, i.e. red), the algorithm introduces a false stop at the traffic light (forming, in practice, a new stage) and recalculates the optimal driving profile taking into account this new false stop, which is added to those provided in the line service.

Preferably, the algorithm also checks whether with limited increases in speed it is possible to try to reach the traffic light with an adequate time reserve (also indicated in the configuration files), so as to guarantee safe passage with a green traffic light without forcing the vehicle to stop.

In summary, by combining the information provided by the traffic-light preference giving block (current state of the traffic light, time preceding the change of state, and the time schedule of each state, which generally does not vary) with that coming from the pre-processing block (position of the vehicle with respect to the traffic light), the time needed to reach the traffic light when the latter is in the green state is calculated. The aforesaid algorithm receives this data and uses it to calculate the optimal driving profile to reach the green traffic light.

In particular, two situations can be distinguished: traffic light information known at departure, and information acquired in proximity of the traffic light.

1) Traffic Information Known at Departure

The traffic light infrastructure provides, as output:

the current state of the traffic light (light_state) which can be green or red the dwell time in the current state (Tleft)

the time interval during which the traffic light is in the red state (Tred)

the time interval when the traffic light is in green state (Tgreen)

The first two data must be provided in conjunction with the departure of the vehicle so that a real-time calculation can be made. The last two can also be provided off-line, i.e. as constants associated with each specific junction and inserted within the configuration files.

To calculate the time available to reach the next traffic light in a green condition, and if the current state is green, it is summed up as follows:

the dwell time left for the current green state (Tleft)

the time interval during which the traffic light is in the red state (Tred) and half of the time interval during which the traffic light is in the green state (Tgreen/2).

That is:

$$Ttrafficlight = Tleft + Tred + Tgreen/2$$

The term Tgreen/2 ensures a time margin in advance and behind the green interval.

By supplying the Ttrafficlight time to the eco-driving profile generating block, the algorithm evaluates whether the Ttrafficlight time is sufficient to travel the distance between the current location of the vehicle, and the next traffic light.

If this is not possible, a new Ttrafficlight time available to reach the next green traffic light is recalculated by adding a green/red switching cycle:

$$Ttrafficlight = Tleft + Tred + Tgreen + Tred + Tgreen/2$$

Again, the Ttrafficlight time is provided to the eco-driving profile generating block, which again checks whether the Ttrafficlight time is sufficient for the vehicle to arrive at the next traffic light. The procedure continues until a positive outcome is obtained.

The procedure is similar if the current state of the next traffic light is red, in fact it is possible to calculate:

$$Ttrafficlight = Tleft + Tgreen + Tred + Tgreen/2$$

The Ttrafficlight time obtained from the previous procedure is used as the arrival time of a possible false intermediate stop. The speed will only be set to zero at the traffic light if the preference giving system has information that the traffic light state will be red, as the vehicle will necessarily have to stop on arrival at the traffic light. At the restart, the algorithm will recalculate the remaining available time D to reach the end of the stage and recalculate the optimal driving profile.

2) Information Acquired in Proximity of the Traffic Light Infrastructure

Based on the data transmitted by the traffic light infrastructure, the following data are known:

relative distance between the next traffic light and the vehicle current traffic light state (red or green)

dwell time of the current state duration of the traffic light states (this information may also already be present in the configuration files).

A check is made on the current optimal driving profile: if it is predicted that the vehicle, by following the current driving profile, will cross the traffic light in the green state, the driving profile is maintained without corrections and considered still valid (in particular, the vehicle has a safety margin represented by the time it remains in the yellow state).

On the other hand, if it is predicted that the vehicle, by following the current driving profile, will cross the traffic light in the red state, the driving profile is recalculated.

Three cases can be distinguished for recalculation:
1. if it is predicted that the vehicle, by following the current driving profile, will cross the traffic light in the red state, at a first portion of the dwell time of the red state (for example, in the first third of the dwell time of the red state), then the driving profile is recalculated by setting an additional acceleration, adapted to avoid encountering the red state;

2. if it is predicted that the vehicle, by following the current driving profile, will cross the traffic light in the red state at a last portion of the dwell time of the red state (e.g., in the last third of the dwell time of the red state), then the driving profile is recalculated by setting an additional deceleration that will allow to cross the traffic light in the subsequent green state;
3. if it is predicted that the vehicle, by following the current driving profile, will cross the traffic light in an intermediate portion of the dwell time in the red state (for example, in the interval between ⅓ and ⅔ of the dwell time of the red state), then the driving profile is recalculated according to at least one of the following modes:
   a. a new false stop is imposed in the point of the traffic light, and the new driving profile to be followed until the traffic light is reached is recalculated; the space from the new false stop to the next stop established by the service is considered as a new stage, where the optimal driving profile is normally calculated;
   b. a deceleration is imposed that allows the traffic light to be crossed in the subsequent green state;
   c. an acceleration is imposed that allows encountering the traffic light in the previous green state.

Preferably, these recalculation modes are all performed, and the driving profiles recalculated according to the three modes are compared with each other in order to select the best one in terms of energy saving. The optimal driving profile, therefore, will be the best performing of the three.

As an alternative to the architecture shown in FIG. 8, other solutions are however possible, for example an architecture in which the input data are managed and processed by a front-end processor before being appropriately sorted to the blocks that require their use.

From the above, the advantages of the method implemented to determine the optimum driving profile are evident.

In particular, the algorithm provides real-time signals indicative of the power to be used instant by instant while driving, in order to reach a defined place in an allocated time, with minimum energy consumption. The algorithm takes into account both the vehicle, the route and the service characteristics. Preferably, information coming from on-board ADAS (e.g. information coming from obstacle detection systems) as well as information coming from a traffic-light preference giving block are also taken into account.

As explained in detail above, the method presents an excellent compromise between calculation speed and result precision, for example thanks to the discretization of the accelerations assumed in the processing of the equations of motion and thanks to the checks for discarding, at each interval Δt analysed, the points that are not plausible.

Moreover, compared to known solutions in which the driving profiles are composed of a rigidly ordered sequence consisting of an acceleration step, a cruising step and a coasting deceleration step, the proposed method has no constraints in the composition and order of the assumed accelerations (ajk): in fact, the algorithm allows to find even more articulated driving profiles, if necessary. In fact, in each interval Δt the algorithm can choose any of the accelerations ajk (which are determined based on the values aj set in the configuration step).

Finally, it is clear from the foregoing that modifications and variations may be made to the method and control system described above with reference to the appended figures, which do not fall outside the scope of protection of the present invention as defined in the appended claims.

In particular, some information could be neglected in order to simplify the algorithm; for example, the slopes of the route could be neglected when setting the accelerations in the equations of motion and calculating the energy required at each interval Δt if the missions to be travelled by the vehicle are essentially flat. Resistances related to the curves of the route could also be neglected when calculating the accelerations (ajk) in the equations of motion and calculating the energy at each interval Δt, in cases where the route has curves of relatively large radius (e.g. greater than 200 m). Aerodynamic resistances could also be neglected in cases where speeds are below 50-55 km/h, as is the case in most urban routes.

The invention claimed is:

1. A method for generating an optimal driving profile for vehicles provided with electric propulsion; the method comprising the steps of:
   providing input data comprising:
   a) first data (I1b) relating to characteristics of a pre-established route and comprising at least one arrival point (ATn);
   b) second data (I1a) relating to characteristics of a vehicle that must travel along said route;
   c) third data (I1c) indicative of at least one time (On) to be met along said route;
   providing a sequence of consecutive time intervals (Δt(k)) until said time (On);
   providing accelerations (ajk), in finite number, which the vehicle can hypothetically take in each of said time intervals (Δt(k));
   applying laws of uniformly accelerated motion for each of said accelerations (ajk) and for the first of said time intervals, so as to generate hypothetical future points, starting from an initial point defined by current position and speed of the vehicle;
   repeating the application of laws of uniformly accelerated motion for each of said accelerations (ajk) and for each of the other time intervals, one after the other, to generate hypothetical future points (P(k)), starting from each point (P(k−1)) which has been determined at the previous time interval, until reaching said arrival point;
   for each of said time intervals (Δt(k)), providing one or more predefined constraints and, before analysing the subsequent time interval (Δt(k+1)), checking whether the generated future points (P(k)) meet all the predefined constraints; if the checking step has a negative outcome, the point (P(k)) being checked is eliminated from the plausible hypotheses;
   for each of the remaining points that passed the checking step, calculating the energy consumption (ΔE) required to arrive at the remaining point, starting from the point that generated it;
   obtaining a plurality of possible driving profiles, each defined by a respective sequence of remaining points, concatenated one with the other, up to the arrival point;
   summing up the energy consumptions (ΔE), so as to determine, for each of said driving profiles, a corresponding overall energy required to reach the arrival point; and
   selecting, from among said driving profiles, the one having the lowest overall energy; and
   checking whether each of said accelerations would require a traction force greater than the maximum traction force that can be supplied by an electric traction system of the vehicle;
   wherein the acceleration that would require a traction force greater than the maximum traction force is reduced so as to request the maximum traction force and generate a new hypothetical future point.

2. The method according to claim 1, wherein said checking step comprises the operation of checking whether the position (x(k)) foreseen at the end of the considered time interval (t(k)) is greater than the previous position (x(k−1)), or the operation of checking whether the speed (v(k)) foreseen at the end of the considered time interval (t(k)) is greater than zero.

3. The method according to claim 1, wherein said checking step comprises at least one of the following operations:
checking whether the speed v(k) foreseen at the end of the considered time interval (t(k)) is lower than an allowed maximum value (vmax);
checking whether the acceleration (ajk) in the considered time interval (t(k)) is lower than an allowed maximum value;
checking whether the jerk in the considered time interval (t(k)) is lower than an allowed maximum value.

4. The method according to claim 3, further comprising the steps of:
receiving data provided by an ADAS,
establishing the allowed maximum value for the speed, according to the data of the ADAS.

5. The method according to claim 1, wherein said checking step comprises the operation of checking whether it is possible to reach the arrival point within said time, starting from each of the generated points (P(k)) assuming that the vehicle travels the remaining route with a predefined motion profile.

6. The method according to claim 1, wherein the maximum traction force is identified by means of a chart that represents a force-speed characteristic.

7. The method according to claim 1, wherein said accelerations are at least five.

8. The method according to claim 1, wherein the time intervals all have the same value, except for the proximity of the arrival point, where they have a lower value.

9. The method according to claim 1, comprising the steps of
checking whether position and/or speed of the vehicle satisfy the selected driving profile;
recalculating the optimal driving profile if position and/or speed of the vehicle do not satisfy the optimal driving profile within a pre-set threshold.

10. A control system in an electric propulsion vehicle, the control system comprising a driving profile generating block configured so as to carry out the method according to claim 1.

11. A method for generating an optimal driving profile for vehicles provided with electric propulsion; the method comprising the steps of:
providing input data comprising:
a) first data (I1b) relating to characteristics of a pre-established route and comprising at least one arrival point (ATn);
b) second data (I1a) relating to characteristics of a vehicle that must travel along said route;
c) third data (I1c) indicative of at least one time (On) to be met along said route;
providing a sequence of consecutive time intervals (Δt(k)) until said time (On);
providing accelerations (ajk), in finite number, which the vehicle can hypothetically take in each of said time intervals (Δt(k));
applying laws of uniformly accelerated motion for each of said accelerations (ajk) and for the first of said time intervals, so as to generate hypothetical future points, starting from an initial point defined by current position and speed of the vehicle;
repeating the application of laws of uniformly accelerated motion for each of said accelerations (ajk) and for each of the other time intervals, one after the other, to generate hypothetical future points (P(k)), starting from each point (P(k−1)) which has been determined at the previous time interval, until reaching said arrival point;
for each of said time intervals (Δt(k)), providing one or more predefined constraints and, before analysing the subsequent time interval (Δt(k+1)), checking whether the generated future points (P(k)) meet all the predefined constraints; if the checking step has a negative outcome, the point (P(k)) being checked is eliminated from the plausible hypotheses;
for each of the remaining points that passed the checking step, calculating the energy consumption (ΔE) required to arrive at the remaining point, starting from the point that generated it;
obtaining a plurality of possible driving profiles, each defined by a respective sequence of remaining points, concatenated one with the other, up to the arrival point;
summing up the energy consumptions (ΔE), so as to determine, for each of said driving profiles, a corresponding overall energy required to reach the arrival point; and
selecting, from among said driving profiles, the one having the lowest overall energy;
wherein said first data (I1b) comprise a plurality of stages, each having a respective arrival point and a respective time; and wherein the method comprises the steps of:
receiving data provided by a traffic-light preference giving system;
introducing a false stop defining a new stage, if the data provided by the traffic-light preference giving system indicates a prediction of encountering a red traffic light.

12. A method for generating an optimal driving profile for vehicles provided with electric propulsion; the method comprising the steps of:
providing input data comprising:
a) first data (I1b) relating to characteristics of a pre-established route and comprising at least one arrival point (ATn);
b) second data (I1a) relating to characteristics of a vehicle that must travel along said route;
c) third data (I1c) indicative of at least one time (On) to be met along said route;
providing a sequence of consecutive time intervals (Δt(k)) until said time (On);
providing accelerations (ajk), in finite number, which the vehicle can hypothetically take in each of said time intervals (Δt(k));
applying laws of uniformly accelerated motion for each of said accelerations (ajk) and for the first of said time intervals, so as to generate hypothetical future points, starting from an initial point defined by current position and speed of the vehicle;
repeating the application of laws of uniformly accelerated motion for each of said accelerations (ajk) and for each of the other time intervals, one after the other, to generate hypothetical future points (P(k)), starting from each point (P(k−1)) which has been determined at the previous time interval, until reaching said arrival point;
for each of said time intervals (Δt(k)), providing one or more predefined constraints and, before analysing the subsequent time interval ($\Delta t(k+1)$), checking whether the generated future points (P(k)) meet all the predefined constraints; if the checking step has a negative outcome, the point (P(k)) being checked is eliminated from the plausible hypotheses;

for each of the remaining points that passed the checking step, calculating the energy consumption ($\Delta E$) required to arrive at the remaining point, starting from the point that generated it;

obtaining a plurality of possible driving profiles, each defined by a respective sequence of remaining points, concatenated one with the other, up to the arrival point;

summing up the energy consumptions ($\Delta E$), so as to determine, for each of said driving profiles, a corresponding overall energy required to reach the arrival point;

selecting, from among said driving profiles, the one having the lowest overall energy;

receiving data provided by a traffic-light preference giving system; and varying the selected driving profile, by introducing a positive or negative acceleration, if the data provided by the traffic-light preference giving system indicates a prediction of encountering a red traffic light.

13. A method for generating an optimal driving profile for vehicles provided with electric propulsion; the method comprising the steps of:

providing input data comprising:
a) first data (I1b) relating to characteristics of a pre-established route and comprising at least one arrival point (ATn);
b) second data (I1a) relating to characteristics of a vehicle that must travel along said route;
c) third data (I1c) indicative of at least one time (On) to be met along said route;

providing a sequence of consecutive time intervals ($\Delta t(k)$) until said time (On);

providing accelerations (ajk), in finite number, which the vehicle can hypothetically take in each of said time intervals ($\Delta t(k)$);

applying laws of uniformly accelerated motion for each of said accelerations (ajk) and for the first of said time intervals, so as to generate hypothetical future points, starting from an initial point defined by current position and speed of the vehicle;

repeating the application of laws of uniformly accelerated motion for each of said accelerations (ajk) and for each of the other time intervals, one after the other, to generate hypothetical future points (P(k)), starting from each point (P(k−1)) which has been determined at the previous time interval, until reaching said arrival point;

for each of said time intervals ($\Delta t(k)$), providing one or more predefined constraints and, before analysing the subsequent time interval ($\Delta t(k+1)$), checking whether the generated future points (P(k)) meet all the predefined constraints; if the checking step has a negative outcome, the point (P(k)) being checked is eliminated from the plausible hypotheses;

for each of the remaining points that passed the checking step, calculating the energy consumption ($\Delta E$) required to arrive at the remaining point, starting from the point that generated it;

obtaining a plurality of possible driving profiles, each defined by a respective sequence of remaining points, concatenated one with the other, up to the arrival point;

summing up the energy consumptions ($\Delta E$), so as to determine, for each of said driving profiles, a corresponding overall energy required to reach the arrival point; and selecting, from among said driving profiles, the one having the lowest overall energy;

wherein said first data (I1b) comprise a plurality of stages, each having a respective arrival point and a respective time; and wherein the method comprises the steps of:

receiving data provided by an ADAS, introducing a false stop defining a new stage, if the data provided by the ADAS indicates a prediction of an obstacle.

* * * * *